US010936030B2

(12) United States Patent
Kim et al.

(10) Patent No.: US 10,936,030 B2
(45) Date of Patent: Mar. 2, 2021

(54) METHOD AND DEVICE FOR CONTROLLING TEMPERATURE

(71) Applicant: Samsung Electronics Co., Ltd., Suwon-si (KR)

(72) Inventors: Kwangwook Kim, Seoul (KR); Jeonggyu Park, Yongin-si (KR); Yeonchang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 14/944,703

(22) Filed: Nov. 18, 2015

(65) Prior Publication Data

US 2016/0139638 A1 May 19, 2016

(30) Foreign Application Priority Data

Nov. 19, 2014 (KR) .................. 10-2014-0161777

(51) Int. Cl.
*G06F 1/20* (2006.01)
*G06F 1/3203* (2019.01)
(Continued)

(52) U.S. Cl.
CPC .............. *G06F 1/206* (2013.01); *G06F 1/20* (2013.01); *G06F 1/3203* (2013.01); *G06F 1/324* (2013.01); *G06F 1/3296* (2013.01); *Y02D 10/00* (2018.01)

(58) Field of Classification Search
CPC . G06F 1/206; G06F 1/324; G06F 1/20; G06F 1/3296; G06F 1/3203; Y02D 10/172; Y02D 10/126
See application file for complete search history.

(56) References Cited

U.S. PATENT DOCUMENTS 4,991,770 A * 2/1991 Bird .................... G05B 5/01
236/44 C
5,085,526 A * 2/1992 Sawtell .................. G05F 1/648
327/512
(Continued)

FOREIGN PATENT DOCUMENTS

EP 1798100 A2 * 6/2007 .......... B60L 11/1864
KR 10-0276141 B1 12/2000
(Continued)

OTHER PUBLICATIONS

Korean Office Action dated Oct. 28, 2020, issued in a counterpart Korean Application No. 10-2014-0161777.

*Primary Examiner* — James J Lee
*Assistant Examiner* — Shon G Foley
(74) *Attorney, Agent, or Firm* — Jefferson IP Law, LLP

(57) ABSTRACT

A system and method are provided for controlling a temperature of a communication base station system or similar device. The method includes collecting temperature information from at least one location in a system such as a base station, setting hysteresis-based temperature settings for a first base temperature for starting to operate a temperature control device in the base station, and a second base temperature for terminating operation of the temperature control device based on the collected temperature information, generating temperature control information by comparing the set hysteresis-based temperature and the collected temperature information, and controlling the temperature control device and/or power to the base station by using the temperature control information.

18 Claims, 12 Drawing Sheets

(51) Int. Cl.
*G06F 1/324* (2019.01)
*G06F 1/3296* (2019.01)

(56) References Cited

U.S. PATENT DOCUMENTS

| | | | | |
|---|---|---|---|---|
| 6,101,610 A | * | 8/2000 | Beebe | G06F 1/206 |
| | | | | 713/323 |
| 2007/0203481 A1 | * | 8/2007 | Gregg | A61B 18/1233 |
| | | | | 606/34 |
| 2009/0008076 A1 | * | 1/2009 | Shariff | H05K 7/20581 |
| | | | | 165/249 |
| 2010/0234968 A1 | * | 9/2010 | Kurachi | G05B 9/02 |
| | | | | 700/3 |
| 2013/0346783 A1 | * | 12/2013 | Weber | G06F 11/3058 |
| | | | | 713/340 |

FOREIGN PATENT DOCUMENTS

| | | |
|---|---|---|
| KR | 10-2003-0021353 A | 3/2003 |
| KR | 10-2009-0090759 A | 8/2009 |

\* cited by examiner

METHOD AND DEVICE FOR CONTROLLING TEMPERATURE

CROSS-REFERENCE TO RELATED APPLICATION(S)

This application claims the benefit under 35 U.S.C. § 119(a) of a Korean patent application filed on Nov. 19, 2014 in the Korean Intellectual Property Office and assigned Ser. No. 10-2014-0161777, the entire disclosure of which is hereby incorporated by reference.

TECHNICAL FIELD

The present disclosure relates to a method and a device for controlling temperature. More particularly, the present disclosure relates to a method and a device for controlling temperature of a communication base station system or similar system by using a hysteresis circuit.

BACKGROUND

Communication base station systems are divided into indoor types and outdoor types according to their installed locations, and the outdoor type base station systems must operate normally in a temperature range of −40° C. to +50° C.

For the normal operation of a base station system in this temperature range, each component must operate at −40° C. and therefore, the internal components of the system are configured with industrial standard components. However, the use of industrial standard components may have the disadvantage in that the use of industrial standard components increases costs.

Accordingly, in practice, communication base station equipment is often configured with components normally operating at a specific temperature (hereafter, a base temperature) and utilizes a separate temperature adjusting or control device (for example, a heater). For example, if an internal temperature of a system is lower than the base temperature, the communication base station system is heated by using the temperature control device until the internal temperature satisfies a base temperature condition, then power is supplied to the system. This is called a cold start of the communication base station system.

However, if the internal temperature of the system varies around the base temperature, this will generate problems in the stability of the system. Accordingly, there is a need for research and development to determine a method for operating the system in a stable condition.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a device for controlling a temperature of a communication base station system by using a hysteresis circuit.

An aspect of the present disclosure is to control an operation of a temperature control device with hysteresis-based temperature settings for a first base temperature for starting the operation of the temperature control device and a second base temperature for stopping operation of the temperature control device.

In accordance with another aspect of the present disclosure, a temperature control device is provided. The temperature control device includes a temperature information collecting unit configured to collect temperature information from at least one location in a system, a configuration unit configured to set hysteresis-based temperature settings for a first base temperature for starting an operation of a temperature control device and a second base temperature for stopping operation of the temperature control device based on the collected temperature information, a generating unit configured to generate temperature control information by comparing the hysteresis-based temperature settings and the collected temperature information, and a control unit configured to control the temperature control device by using the temperature control information.

In accordance with another aspect of the present disclosure, a method for controlling temperature is provided. The method includes collecting temperature information from at least one location in a system, setting hysteresis-based temperature settings for a first base temperature for starting an operation of a temperature control device and a second base temperature for stopping operation of the temperature control device based on the collected temperature information, generating temperature control information by comparing the hysteresis-based temperature settings and the collected temperature information, and controlling the temperature control device by using the temperature control information.

Other aspects, advantages, and salient features of the disclosure will become apparent to those skilled in the art from the following detailed description, which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
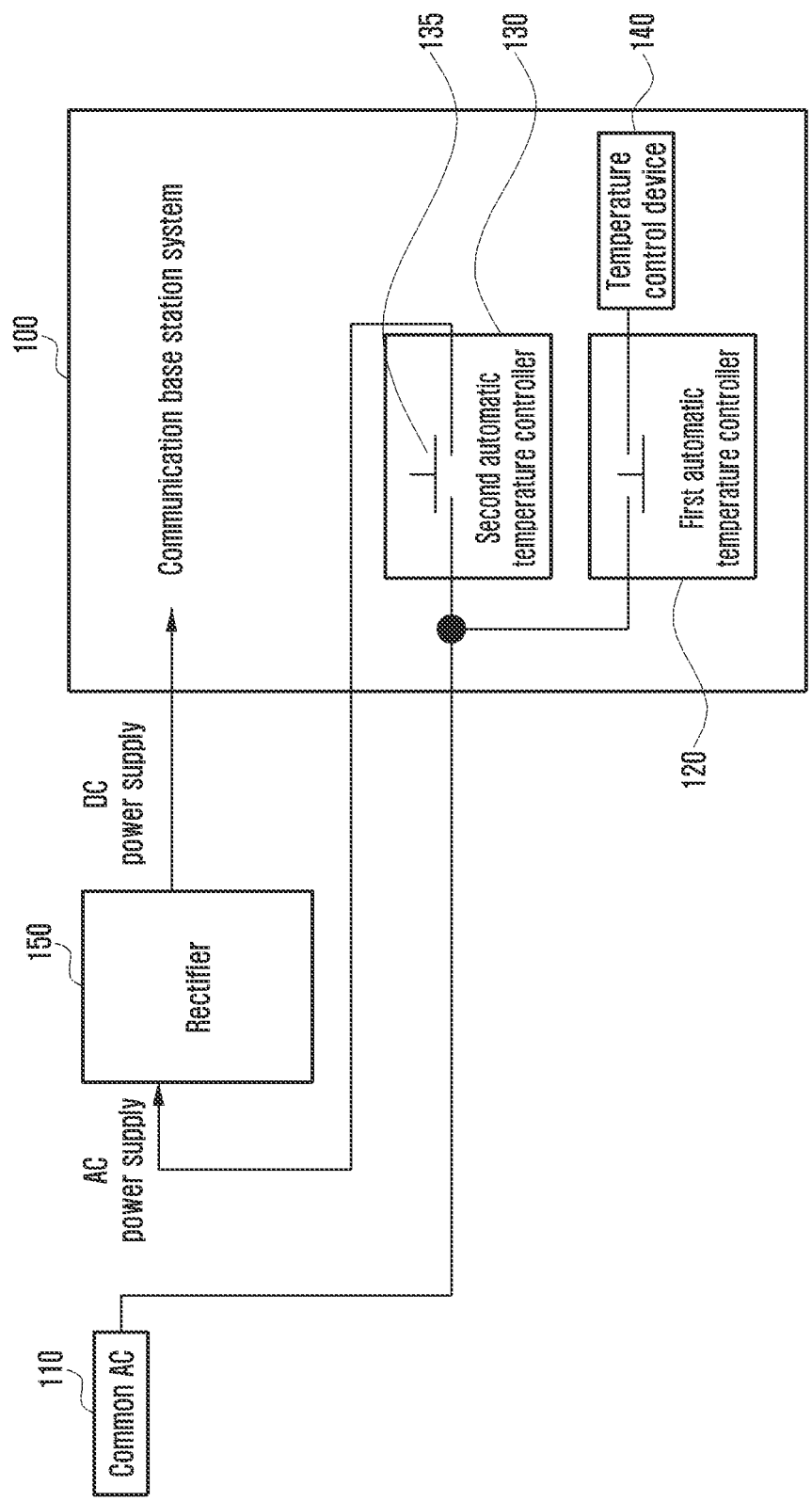
FIG. 1 is a block diagram illustrating an operating procedure of a communication base station system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces. By the term "substantially", it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect that the characteristic was intended to provide.

For the same reasons, some components in the accompanying drawings are emphasized, omitted, or schematically illustrated, and the size of each component does not fully reflect the actual size. Therefore, the present disclosure is not limited to the relative sizes and distances illustrated in the accompanying drawings.

Advantages, characteristics, and implementation methods of the present disclosure will become apparent by referring to the accompanying drawings and detailed descriptions of various embodiments. However, the present disclosure is not limited to the disclosed embodiments and may be implemented in various forms. The various embodiments are intended to merely help the completeness of the present disclosure and are provided to inform the scope of the disclosure clearly to those skilled in the art. The present disclosure is defined by the appended claims, and the same reference numbers indicate the same components throughout the detailed description.

Specific terms used hereafter are provided for easier understanding of the present disclosure, and thereby can be replaced with different forms without departing from the technical spirit of the present disclosure.

FIG. 1 is a block diagram illustrating an operating procedure of a communication base station system according to an embodiment of the present disclosure.

Referring to FIG. 1, for the operation of the communication base station system 100, a common alternating current (AC) power 110 is supplied to the communication base station system 100. If the common AC power 110 is supplied, a first automatic temperature controller 120 operates for the operation of the temperature control device 140. If the first automatic temperature controller 120 operates, the temperature control device 140 increases the temperature of the communication base station system 100. The first automatic temperature controller 120 is a component used for constantly maintaining the temperature for a long time and may be configured with a bimetal formed by laminating 2 different metal sheets but embodiments are not limited thereto.

If the temperature in the communication base station system 100 (hereafter, internal system temperature) reaches a temperature at which internal components of the communication base station system 100 can normally operate (hereafter, base temperature), a switch 135 of a second automatic temperature controller 130 is closed and the AC power is supplied to a rectifier 150. The rectifier 150 converts the AC power to direct current (DC) power and supplies the DC power to the communication base station system 100.

Figure 2:
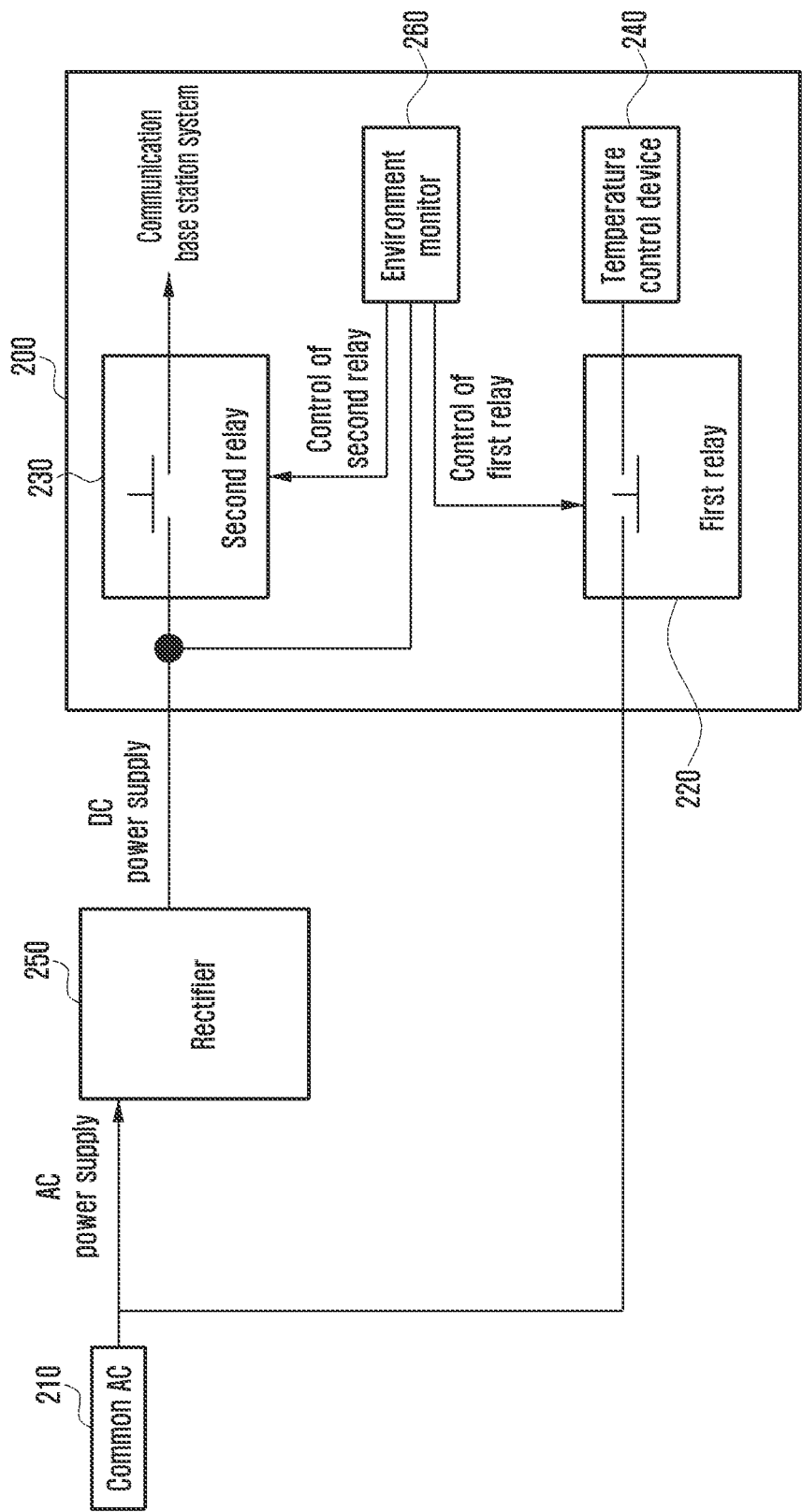
FIG. 2 is a block diagram illustrating another operating procedure of a communication base station system according to an embodiment of the present disclosure.

FIG. 2 is block diagram illustrating another operating procedure of a communication base station system according to an embodiment of the present disclosure.

Referring to FIG. 2, a common AC power 210 is supplied to a communication base station system 200 for the operation of the communication base station system 200. The supplied common AC power 210 is transmitted to a rectifier 250 and the AC power is converted to DC power by the rectifier 250. The converted DC power is supplied to a second relay 230 and an environment monitor 260. If the converted DC power is supplied to the environment monitor 260, the environment monitor 260 starts to operate. The environment monitor 260 detects an internal system temperature and activates a first relay 220 to operate a temperature control device 240 if the detected temperature is lower than a base temperature. If the first relay 220 is activated, the temperature control device 240 starts to operate and increases the internal system temperature. If the internal system temperature reaches the base temperature, the environment monitor 260 controls the second relay 230 to transmit the supplied DC power to the communication base station system 200.

Figure 3:
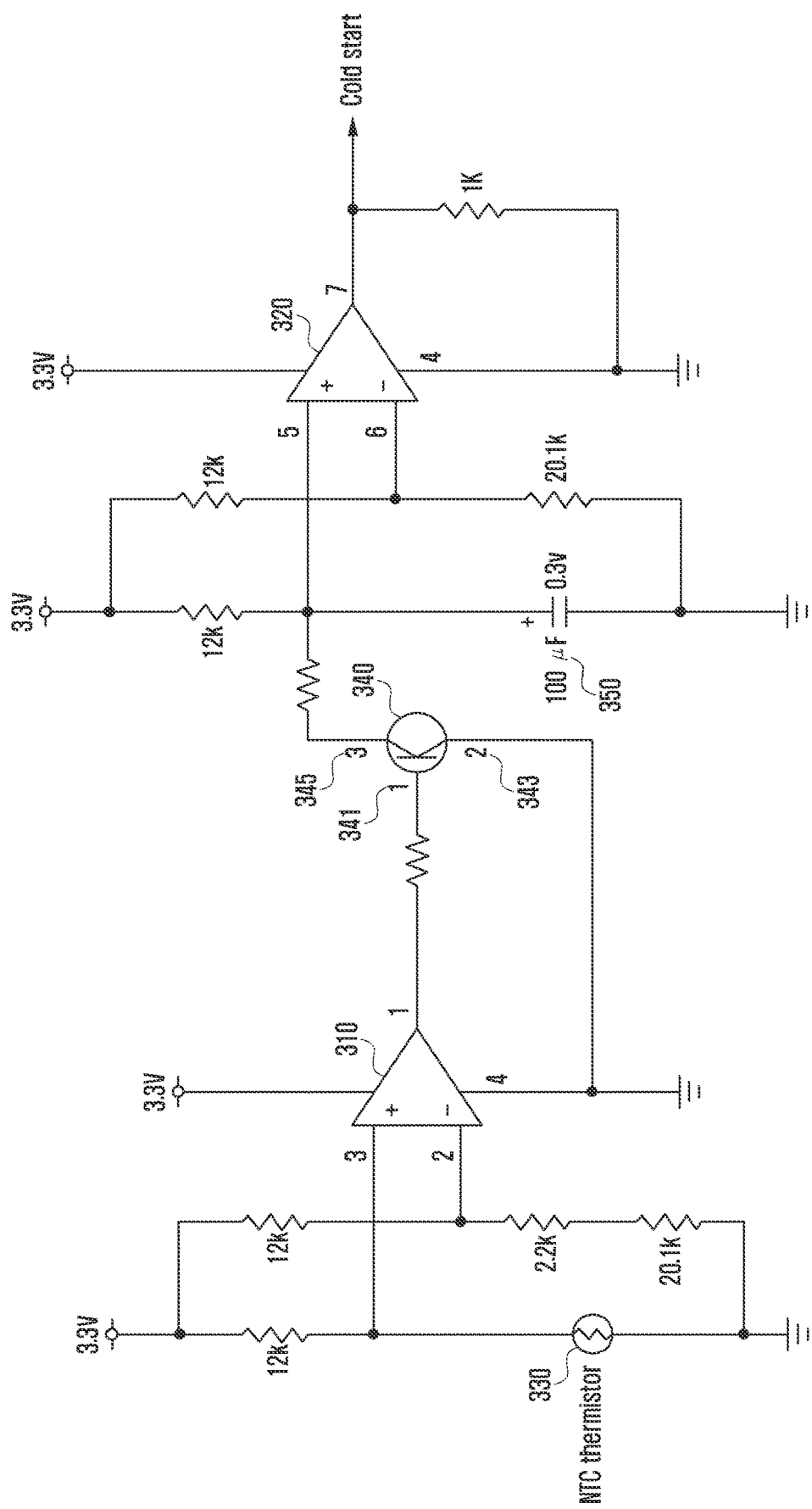
FIG. 3 is a circuit diagram illustrating an internal configuration of a temperature control device according to an embodiment of the present disclosure.

FIG. 3 is a circuit diagram illustrating an internal configuration of a temperature control device according to an embodiment of the present disclosure.

Referring to FIG. 3, a temperature control device 140, 240 can include a comparator 310, a comparator 320, an analog element 330, and a transistor 340. The comparator 310, comparator 320, analog element 330, and transistor 340, can each be provided with biasing and power supply circuit elements as known to those skilled in the art and therefore, detailed descriptions of such biasing and power supply circuit elements are omitted. The analog element 330 may be used in the internal circuit of the communication base station system 100, 200 for temperature control. For example, the analog element 330 may be a negative temperature coefficient (NTC) thermistor. The NTC thermistor is provided as an analog element for exponentially decreasing an element resistance value according to an increase of the element temperature.

If the NTC thermistor 330 is used, the resistance value varies according to the change of the temperature, and thereby a voltage at a (+) terminal of the comparator 310 changes. For example, if an initial temperature of the NTC thermistor 330 is lower than 0° C., the resistance value of the thermistor can be set greater than 32.3 K ohm. Accordingly, if the initial temperature of the NTC thermistor 330 is lower than 0° C., the (+) terminal of the first comparator 310 becomes higher than a (−) terminal, and an output of the first comparator 310 becomes a high state (i.e., 3.3 V). Since the output of the first comparator 310 is coupled with the base 341 of transistor 340, the voltage of the base 341 of the transistor 340 becomes higher than the voltage of an emitter 343, and the transistor 340 is turned on resulting in current flow between a collector 345 and the emitter 343 of the transistor 340. Accordingly, the voltage of the (+) terminal of the second comparator 320 maintains 0 V, and the output of the second comparator 320 becomes a low state (i.e., 0 V) because the (−) terminal of the second comparator 320 becomes higher than the (+) terminal.

Namely, if the initial temperature of the NTC thermistor 330 is lower than 0° C., the output of the second comparator 320 becomes a low state (i.e., 0 V), and the communication base station system does not operate and the temperature control device 140, 240 is operated to increase the temperature of the communication base station system 100, 200.

However, if the initial temperature of the NTC thermistor 330 is higher than 0° C., the resistance value of the thermistor becomes smaller than 32.3 K ohm. Accordingly, the voltage of the (+) terminal of the first comparator 310 becomes lower than the voltage of the (−) terminal, and the output of the first comparator 310 becomes a low state (i.e., 0 V). Further, because the transistor 340 is turned off in this case and resistor-capacitor (RC) charging is generated at a capacitor 350, the output of the second comparator 320 becomes a high state (i.e., 3.3 V).

Namely, if the initial temperature of the NTC thermistor 330 is higher than 0° C., the output of the second comparator 320 becomes a high state (i.e., 3.3 V), and the temperature control device 140, 240 is no longer operated and power is supplied to the communication base station system and the communication base station system 100, 200 starts to operate.

Figure 4:
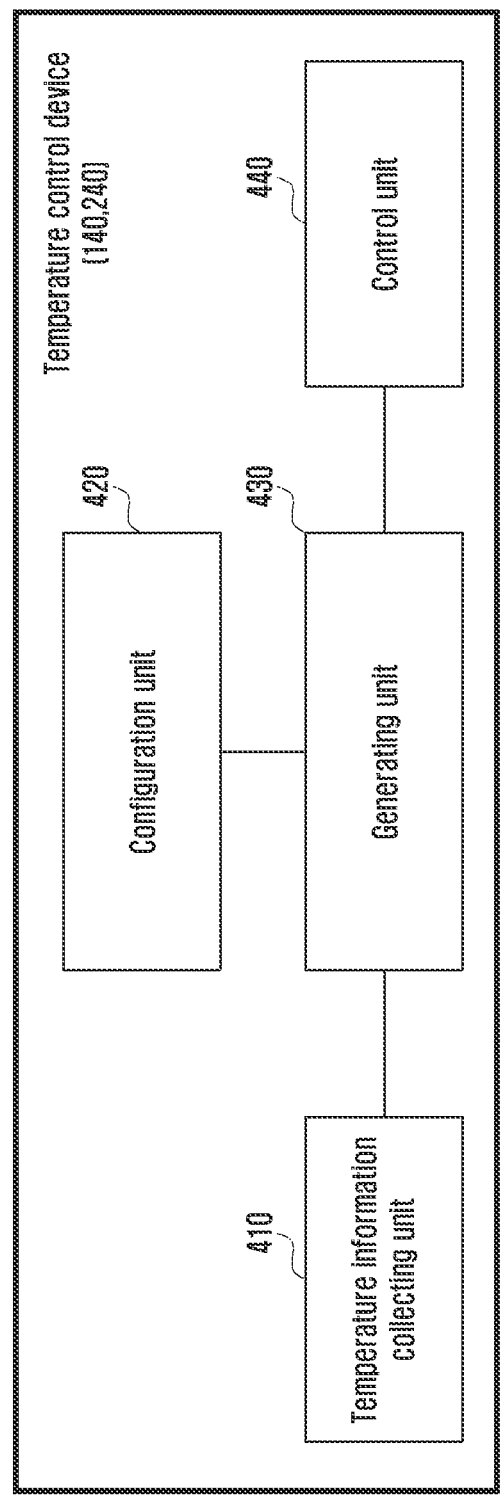
FIG. 4 is a block diagram illustrating an internal configuration of a temperature control device according to an embodiment of the present disclosure.

FIG. 4 is a block diagram illustrating an internal configuration of a temperature control device according to an embodiment of the present disclosure.

Referring to FIG. 4, the temperature control device 140, 240 may be configured with a temperature information collecting unit 410 for collecting internal temperature information of the communication base station system, a configuration unit 420 for setting different hysteresis-based temperature settings of a first base temperature at which the temperature control device starts to operate and a second base temperature at which the temperature control device stops operation, a generating unit 430 for generating temperature control information by comparing the hysteresis-based temperature settings and the internal system temperature, and a temperature control device control unit 440 for controlling the temperature control device by using the control information.

The temperature information collecting unit 410 can collect internal system temperature information. The internal system temperature information may be temperature information measured from at least one location in the communication base station system. A variety of temperature information from different locations is measured because the temperature at all the locations of the components should be higher than a base temperature for normal operation.

For collecting internal system temperature information, an NTC thermistor may be used. As noted above, the NTC thermistor is provided as an analog element whose resistance value changes exponentially according to an increase in element temperature. The term "analog element" used in the present disclosure means an element not including a software module. Accordingly, "analog element" can include at least one resistor, inductor, and capacitor, as well as a diode and an operational amplifier (OPAMP) and associated biasing and power supply circuit elements.

If the temperature information is collected by the temperature information collecting unit 410, the minimum temperature is selected from the collected temperature information. According to an embodiment of the present disclosure, the components are configured with analog elements in the process of selecting the minimum temperature. Detailed descriptions on the selection of a minimum temperature are provided below.

The configuration unit 420 sets hysteresis-based temperature settings so that there is stable control of temperature by the temperature control device 140, 240.

The hysteresis-based temperature settings are set by setting a first base temperature at which the temperature control device starts to operate and a second base temperature at which the temperature control device stops operation. A reason for setting the hysteresis-based temperature settings in this manner is to overcome problems in the prior art of the temperature control device oscillating or otherwise undesirably repeating a turn-on and turn-off operation if the internal temperature varies in the vicinity of the base temperature.

In more detail, in a case where hysteresis-based temperature settings are set, the first base temperature at which the temperature control device starts to operate is different from the second base temperature at which the temperature control device stops operation; therefore, the phenomenon of oscillating or otherwise undesirably repeating a turn-on/turn-off state can be avoided even though the internal system temperature varies in the vicinity of a specific temperature. This will be described in greater detail below.

The generating unit 430 can generate temperature control information by comparing the hysteresis-based temperature settings and the collected internal system temperature. Namely, because the temperature control device should operate when the internal system temperature becomes lower than the first base temperature, in this case the generating unit 430 sets the temperature control information so that the temperature control device becomes a turn-on state. Similarly, the generating unit 430 can set the temperature control information so that the temperature control device becomes a turn-off state in the case where temperature is not required to be increased further because the internal temperature of the communication base station system is higher than the second base temperature.

The temperature control information can be generated in a pulse width modulation (PWM) form by the generating unit 430 but embodiments are not limited thereto.

The control unit 440 then controls the temperature control device by using the temperature control information generated by the generating unit 430.

Figure 5:
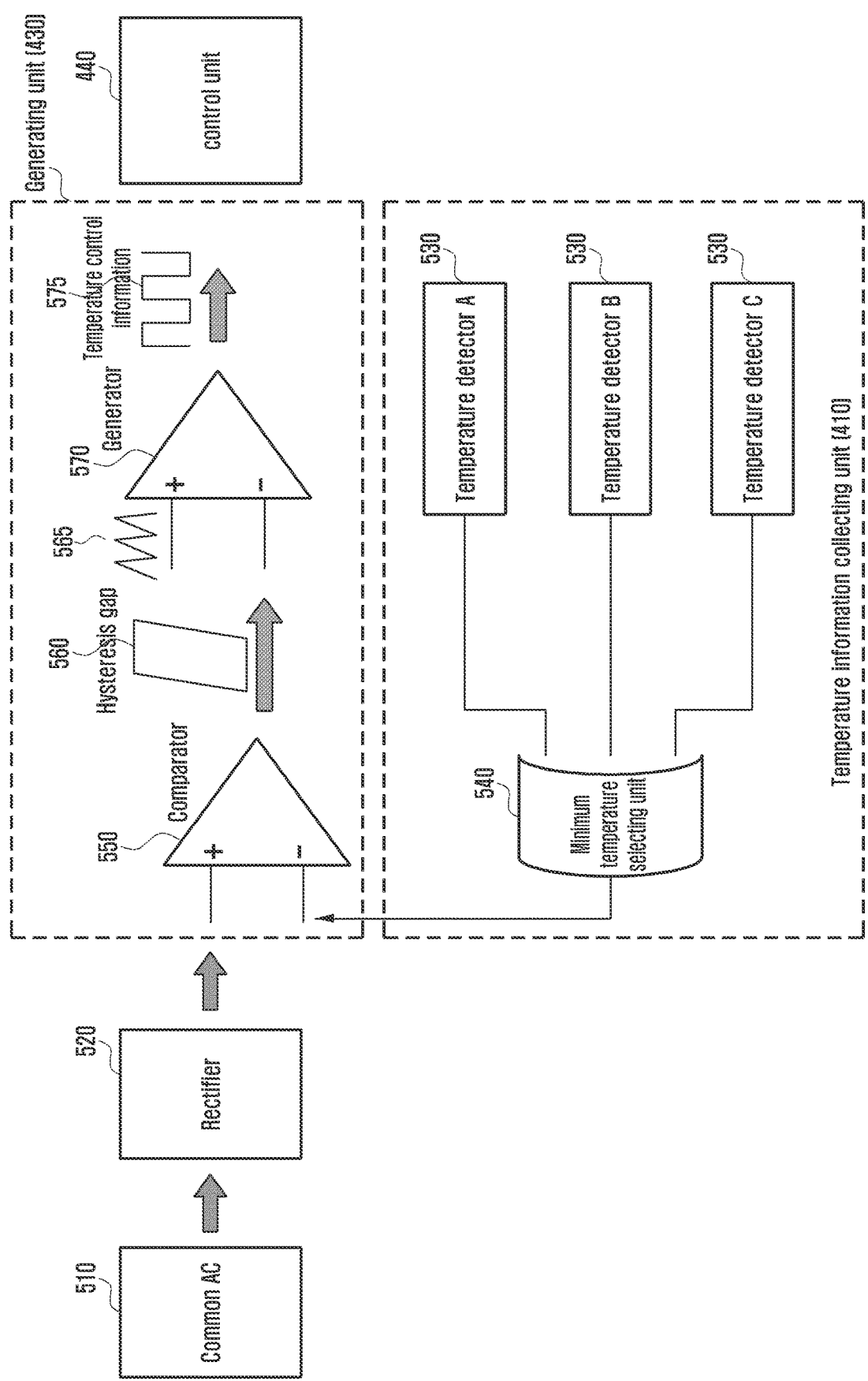
FIG. 5 is a block diagram illustrating a procedure of generating temperature control information by a temperature control device according to an embodiment of the present disclosure.

FIG. 5 is a block diagram illustrating a procedure of generating temperature control information by a temperature control device according to an embodiment of the present disclosure. FIG. 5 is a block diagram illustrating the temperature information collecting unit 410 and generating unit 430 of the temperature control device 140, 240 of FIG. 4 in greater detail.

Referring to FIG. 5, if an external common AC power 510 is supplied to operate a communication base station system, a rectifier 520 converts the supplied AC power 510 to DC power and transmits the converted DC power to the communication base station system.

If the DC power is supplied, temperature detectors A, B, C, 530 located at locations in the communication base station system detect the temperature of each location. The temperature detectors A, B, C, 530 may be configured with analog elements such as an NTC thermistor or similar device. If temperatures are detected by the temperature detectors A, B, C, 530, a minimum temperature selecting unit 540 selects the minimum temperature from the detected temperatures. A minimum temperature is selected because the temperature at all locations in the system should exceed a base temperature for normal operation of all the components.

The selected minimum temperature is transmitted to a comparator 550. The comparator 550 may be configured with an OPAMP or any other suitable circuit. The comparator 550 compares the minimum temperature selected by the minimum temperature selecting unit 540 with determined or preset hysteresis-based temperature settings.

The hysteresis-based temperature settings are set with different settings for a first base temperature at which a temperature control device starts to operate and a second base temperature at which the temperature control device stops operation, so that the problems of oscillating or otherwise undesirably repeating a turn-on/turn-off state can be avoided when the temperature in the communication base station equipment varies in the vicinity of the base temperature.

For example, in the case where a base temperature is assumed to be 0° C. and no hysteresis-based temperature is set, the temperature control device measures an internal temperature of the communication base station equipment and controls the temperature control device. In detail, if the internal temperature is lower than 0° C., the temperature control device 140, 240 is turned on to increase the internal temperature of the communication base station equipment. However, if the internal temperature is higher than 0° C., the temperature control device 140, 240 is turned off. If the temperature control device 140, 240 operates like this, when the internal temperature varies in the vicinity of 0° C. there will be the problem of the temperature control device operating a turn-on/turn-off state repeatedly.

The present disclosure can solve the above problems by setting hysteresis-based temperature settings and providing the additional system and method for temperature control based thereon.

In more detail, in the case where hysteresis-based temperature settings are set, the first base temperature at which the temperature control device starts to operate and the second base temperature at which the temperature control device stops operation will be different.

For example, where the first base temperature is set to −10° C. and the second base temperature is set to +10° C., the temperature control device 140, 240 operates when the internal temperature becomes lower than −10° C. and stops operation when the internal temperature becomes higher than +10° C. Accordingly, a turn-on/turn-off state is not generated repeatedly even though the internal temperature varies in the vicinity of a specific temperature.

The difference between the first base temperature and the second base temperature is defined as a hysteresis gap 560.

The comparator 550 compares the set hysteresis-based temperature and the selected minimum temperature. Namely, the comparator 550 outputs a signal (for example, 1) to operate the temperature control device if the selected minimum temperature is lower than the first base temperature, and outputs a signal (for example, 0) to stop operation of the temperature control device if the selected minimum temperature is higher than the second base temperature.

The output signal of the comparator 550 is transmitted to a generator 570 to generate temperature control information. The generator 570 generates the temperature control information by comparing the signal output by the comparator 550 with a signal 565 output by a triangle wave generator (not shown). The generated temperature control information can be expressed as reference number 575.

If the temperature control information 575 is generated, it is communicated to the control unit 440 and the control unit 440 can control the temperature control device 140, 240 by using the temperature control information.

The comparator 550 and the temperature detectors A, B, C, 530 are configured with analog elements, and thereby have an advantage of providing an analog system that can stably control the temperature according to the properties of the elements.

Figure 6:
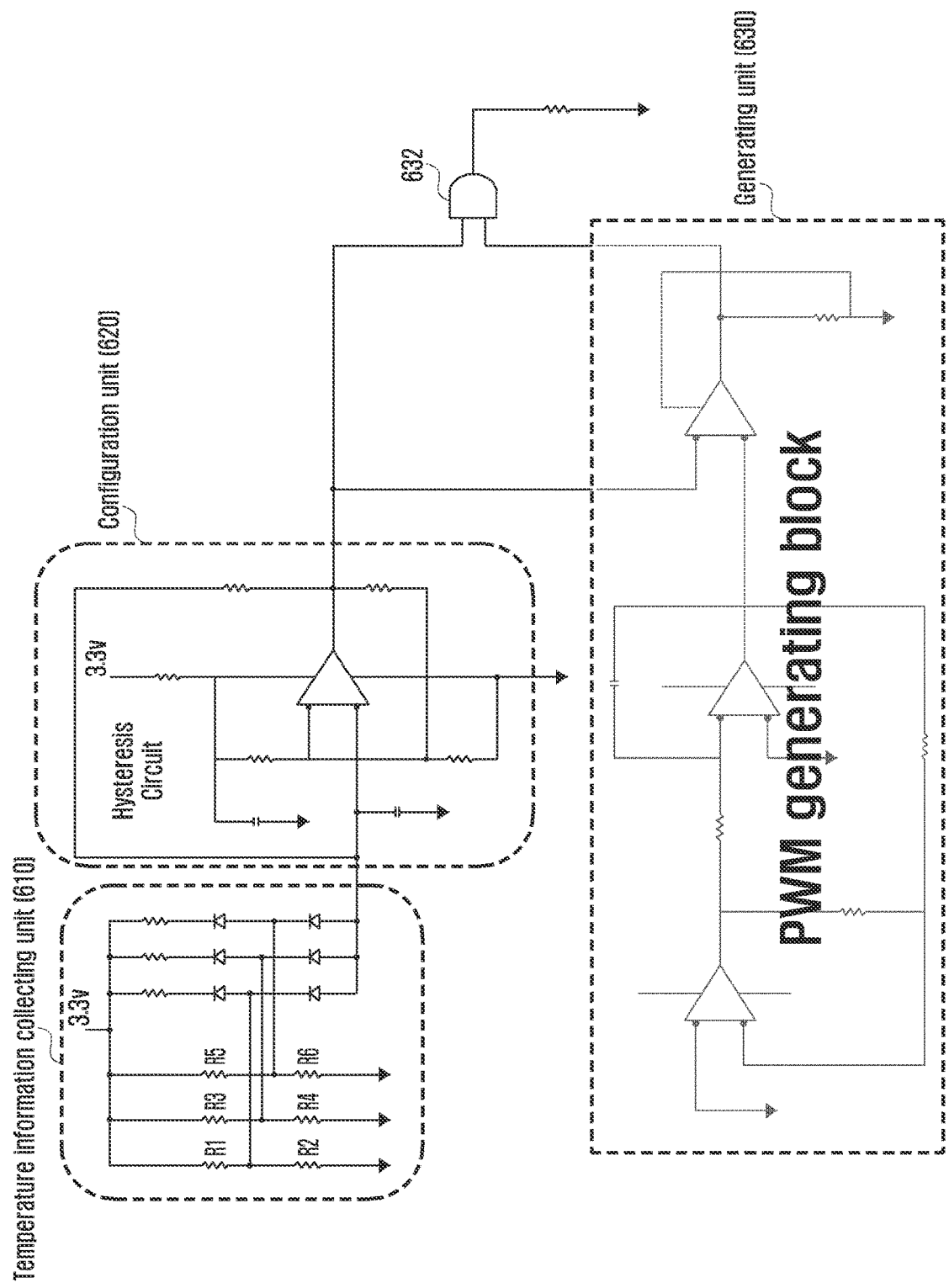
FIG. 6 is a circuit diagram illustrating an internal configuration of a temperature control device according to an embodiment of the present disclosure.

FIG. 6 is a circuit diagram illustrating an internal configuration of a temperature control device according to an embodiment of the present disclosure. FIG. 6 is a circuit diagram illustrating the temperature information collecting unit 410, configuration unit 420 and generating unit 430 of the temperature control device 140, 240 of FIG. 4 in greater detail.

Referring to FIG. 6, the temperature information collecting unit 610 collects temperature information measured at each location in the communication base station and selects the minimum temperature from the collected temperature information.

The temperature information collecting unit 610 is characterized by having one or more analog elements as described above. The analog elements can be provided with biasing and power supply circuit elements as known to those skilled in the art and therefore, detailed descriptions of such biasing and power supply circuit elements are omitted. A circuit configuring the temperature information collecting unit 610 is divided into a part for collecting temperature information and another part for selecting the minimum temperature from the collected information. The output of the temperature information collecting unit 610 may be provided in a voltage form. Detailed descriptions of a procedure of collecting the temperature information and selecting the minimum temperature are provided below.

A configuration unit 620 sets hysteresis-based temperature settings, and a circuit configured to set the hysteresis-based temperature settings is referred to as a hysteresis circuit. The hysteresis circuit can be configured by using an OPAMP or any other suitable circuit as described above. The OPAMP can be provided with biasing and power supply circuit elements as known to those skilled in the art and therefore, detailed descriptions of such biasing and power supply circuit elements are omitted. The hysteresis circuit receives a voltage as a first input corresponding to the minimum temperature selected by the minimum temperature selecting unit 610. Further, the hysteresis circuit can receive an output of the OPAMP as a second input. That is, negative feedback can be used by applying a portion of the output voltage to the inverting input of the OPAMP. When negative feedback is used, the circuit's overall gain and response becomes determined by the feedback network, rather than by the OPAMP characteristics.

Accordingly, the hysteresis-based temperature settings are set by the hysteresis circuit in the configuration unit 620 according to values of the analog elements included in the hysteresis circuit. A user can set the hysteresis-based temperature settings by using the values of analog elements included in the hysteresis circuit.

If the hysteresis-based temperature settings are set, the output of the hysteresis circuit can be set by receiving a voltage as a first input corresponding to the selected minimum temperature. If the selected minimum temperature is lower than the first base temperature of the hysteresis-based temperature setting, the hysteresis circuit can output "1". Similarly, if the selected minimum temperature is higher than the second base temperature, the hysteresis circuit can output "0".

As noted above, the temperature control information can be generated in a pulse width modulation (PWM) form by the generating unit 430. Accordingly, the generating unit 630 is shown including a PWM generating block. Detailed descriptions of the PWM generating block and associated biasing and power supply circuit elements are omitted. The temperature control information can be generated by combining the output value of the configuration unit 620 with an output value of the generating unit 630 through an AND gate 632.

Figure 7A:
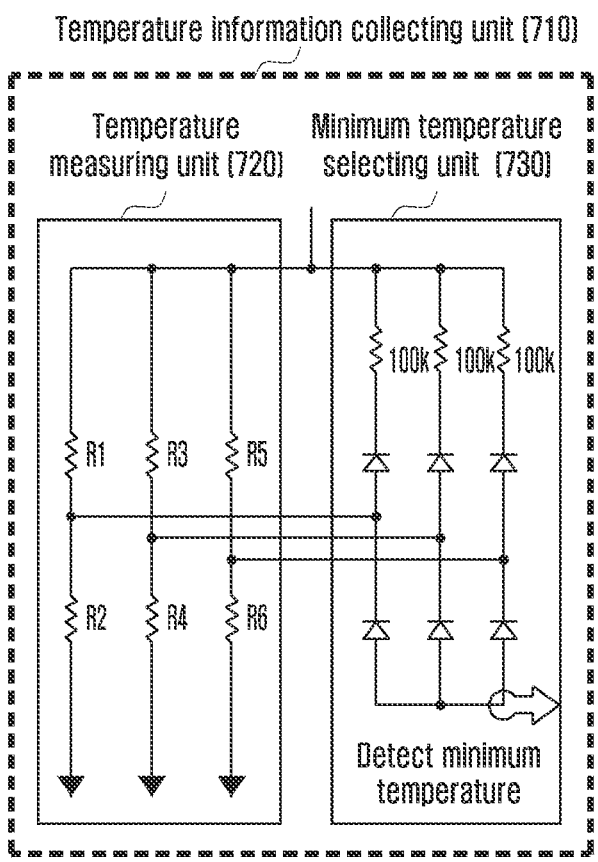
FIG. 7A is a circuit diagram illustrating an internal configuration of a temperature control device for selecting the minimum temperature according to an embodiment of the present disclosure.

FIG. 7A is a circuit diagram illustrating an internal configuration of a temperature control device for selecting the minimum temperature according to an embodiment of the present disclosure. FIG. 7A is a circuit diagram illustrating the temperature information collecting unit 610 in greater detail.

Referring to FIG. 7A, the temperature information collecting unit 710 has the same circuit as the temperature information collecting unit 610 of FIG. 6.

In a temperature measuring unit 720, a circuit configured with analog elements receives a temperature measured from at least one location in the system. The analog elements can be provided with biasing and power supply circuit elements as known to those skilled in the art and therefore, detailed descriptions of such biasing and power supply circuit elements are omitted. In more detail, if an NTC thermistor is used as an analog element whose resistance changes according to the temperature, the resistances of each analog element located in the system may have different values according to the temperature. Accordingly, if individually different resistance values are set, voltages at each location become different.

A minimum temperature selecting unit 730 has a circuit for receiving voltages corresponding to temperatures measured at each location by the temperature measuring unit 720 and for outputting a voltage corresponding to the minimum temperature. The circuit may be configured with an OR circuit using a diode but embodiments are not limited thereto. The OR circuit can be provided with biasing and power supply circuit elements as known to those skilled in the art and therefore, detailed descriptions of such biasing and power supply circuit elements are omitted.

By configuring the circuit in this manner, the minimum temperature can be selected from the temperatures measured at each location in the system.

Figure 7B:
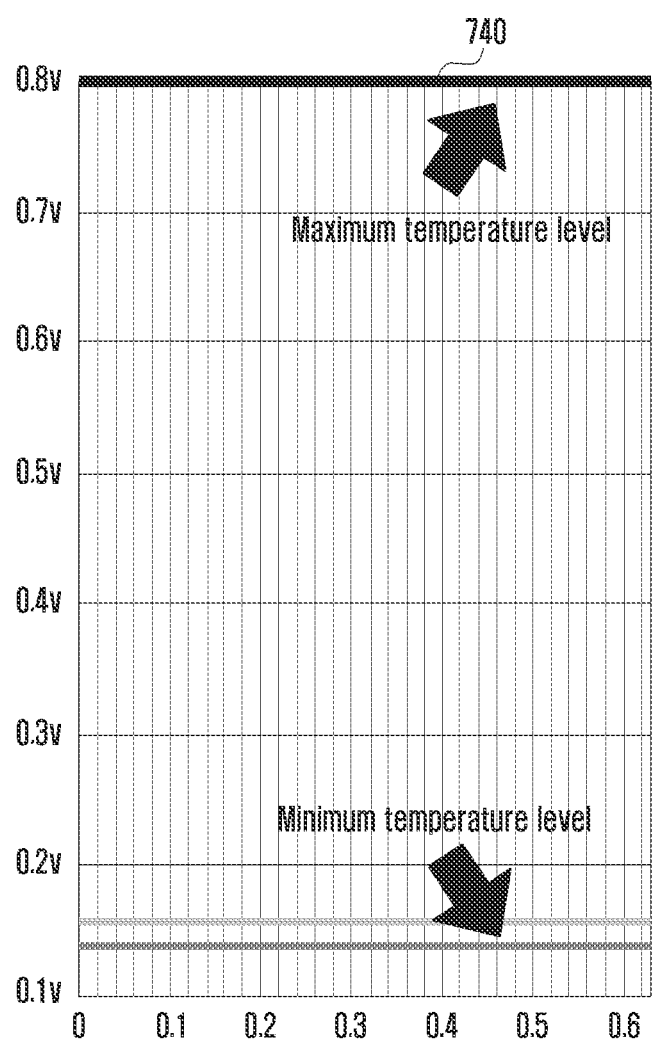
FIG. 7B is a graph illustrating a selection of the minimum temperature according to an embodiment of the present disclosure.

FIG. 7B is a graph illustrating a selection of the minimum temperature according to an embodiment of the present disclosure. Graph 740 illustrates the result of detecting the minimum temperature through the above procedure.

Figure 8:
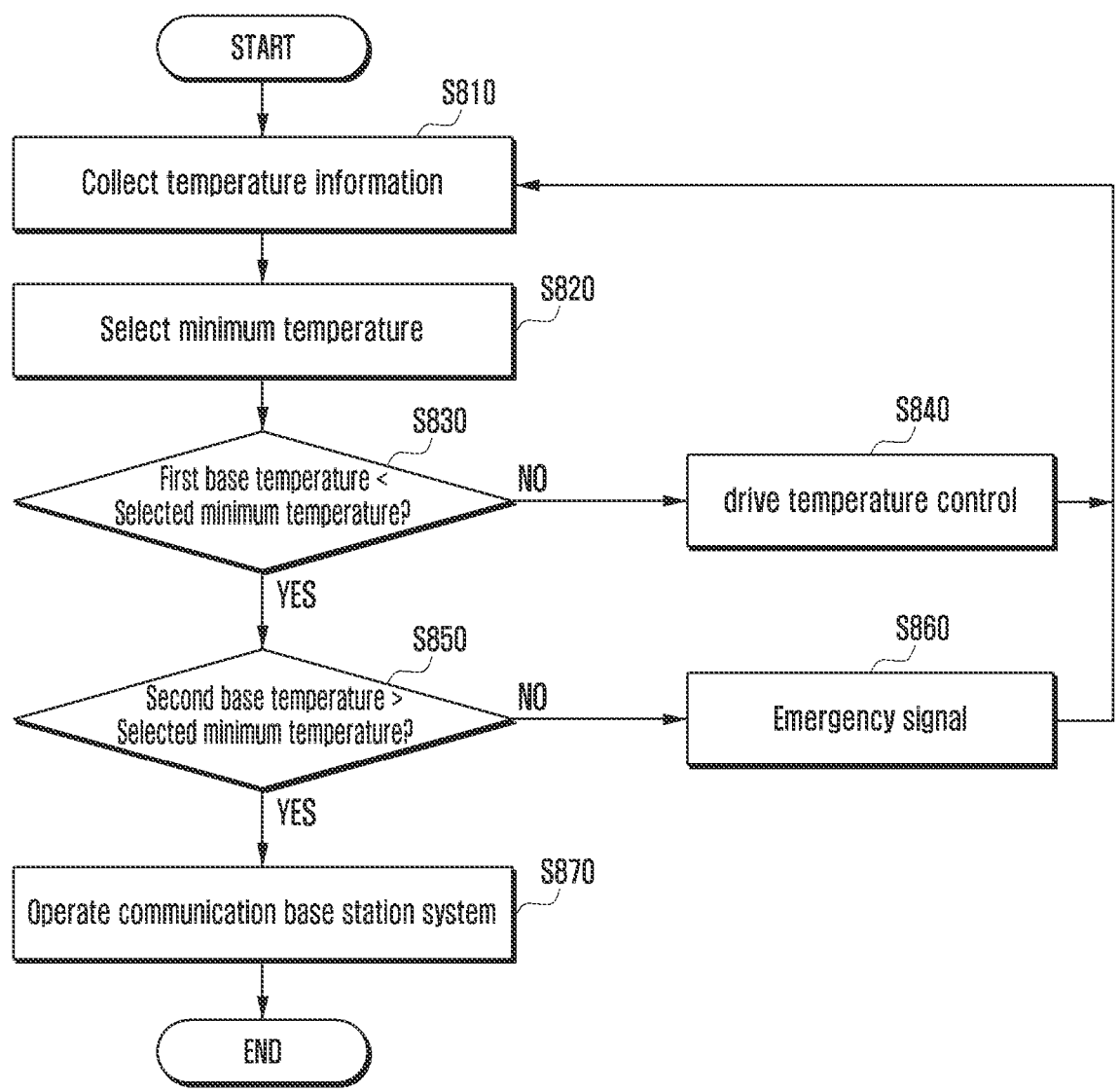
FIG. 8 is a flowchart illustrating a method of controlling a temperature by a temperature control device according to an embodiment of the present disclosure.

FIG. 8 is a flowchart illustrating a method of controlling a temperature by a temperature control device according to an embodiment of the present disclosure.

Referring to FIG. 8, temperature detectors located at each location in the system collect temperature information of each location at operation S810.

If all the temperature information is collected at operation S810, the temperature control device selects the minimum temperature from the collected temperature information at operation S820.

After selecting the minimum temperature at operation S820, the temperature control device compares the first base temperature of the hysteresis-based temperature settings with the selected minimum temperature at operation S830.

According to the result of the comparison at operation S830, if the selected minimum temperature is lower than the first base temperature of the hysteresis-based temperature, the temperature control device drives the temperature control device at operation S840. Subsequently, the internal temperature is measured again by returning to operation S810.

According to the result of the comparison at operation S830, if the selected minimum temperature is higher than the first base temperature of the hysteresis-based temperature, the temperature control device compares the selected minimum temperature with the second base temperature of the hysteresis-based temperature at operation S850.

According to the result of the comparison at operation S850, if the selected minimum temperature is lower than the second base temperature of the hysteresis-based temperature, the communication base station system starts to operate at operation S870. However, if the selected minimum temperature is higher than the second base temperature of the hysteresis-based temperature, the temperature control device transmits an emergency signal at operation S860. Subsequently, the internal temperature of the system is measured again by returning to operation S810.

The emergency signal at operation S860 is transmitted because components in the system can be damaged due to high temperature in the communication base station system. The operation of the temperature control device may stop according to the emergency signal.

Figure 9A:
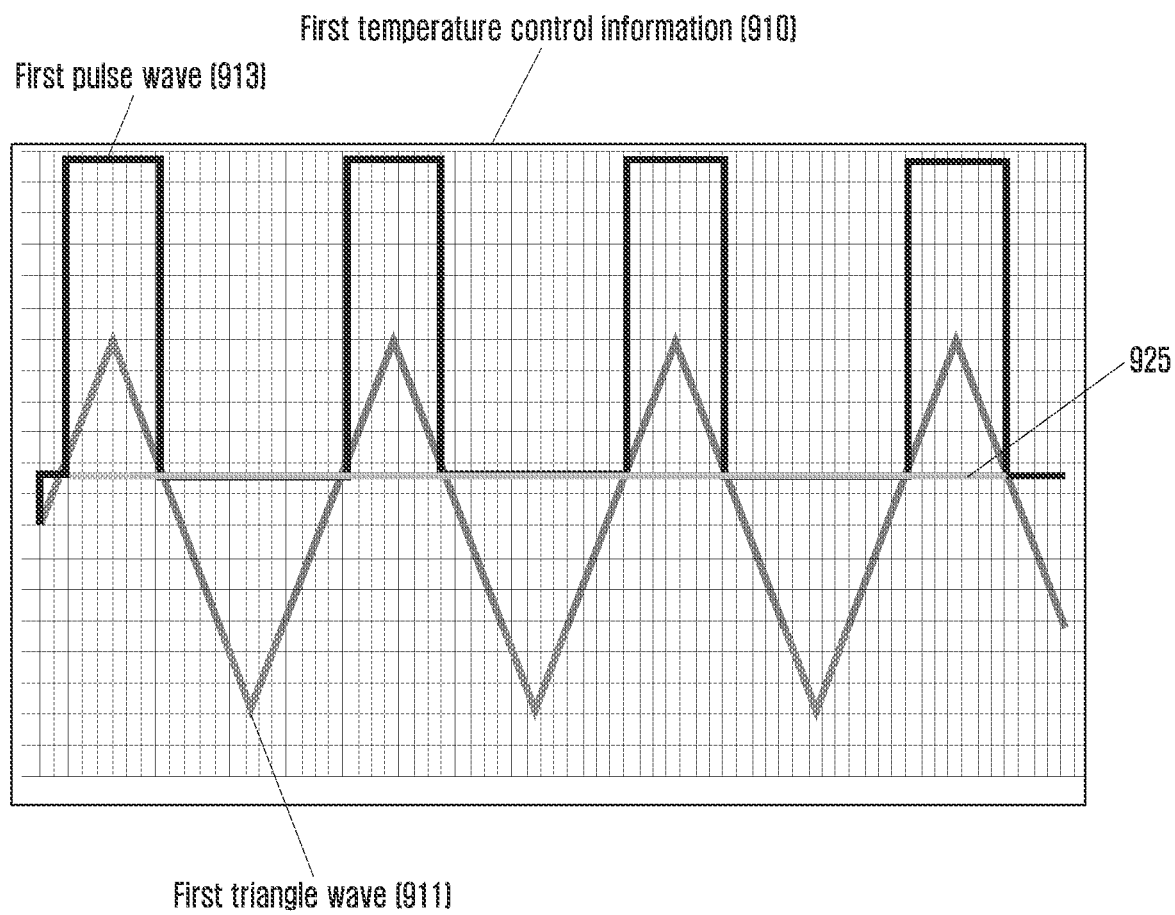
FIG. 9A is a graph illustrating an example of displaying temperature control information generated by a temperature control device using one hysteresis-based temperature setting according to an embodiment of the present disclosure.
Figure 9B:
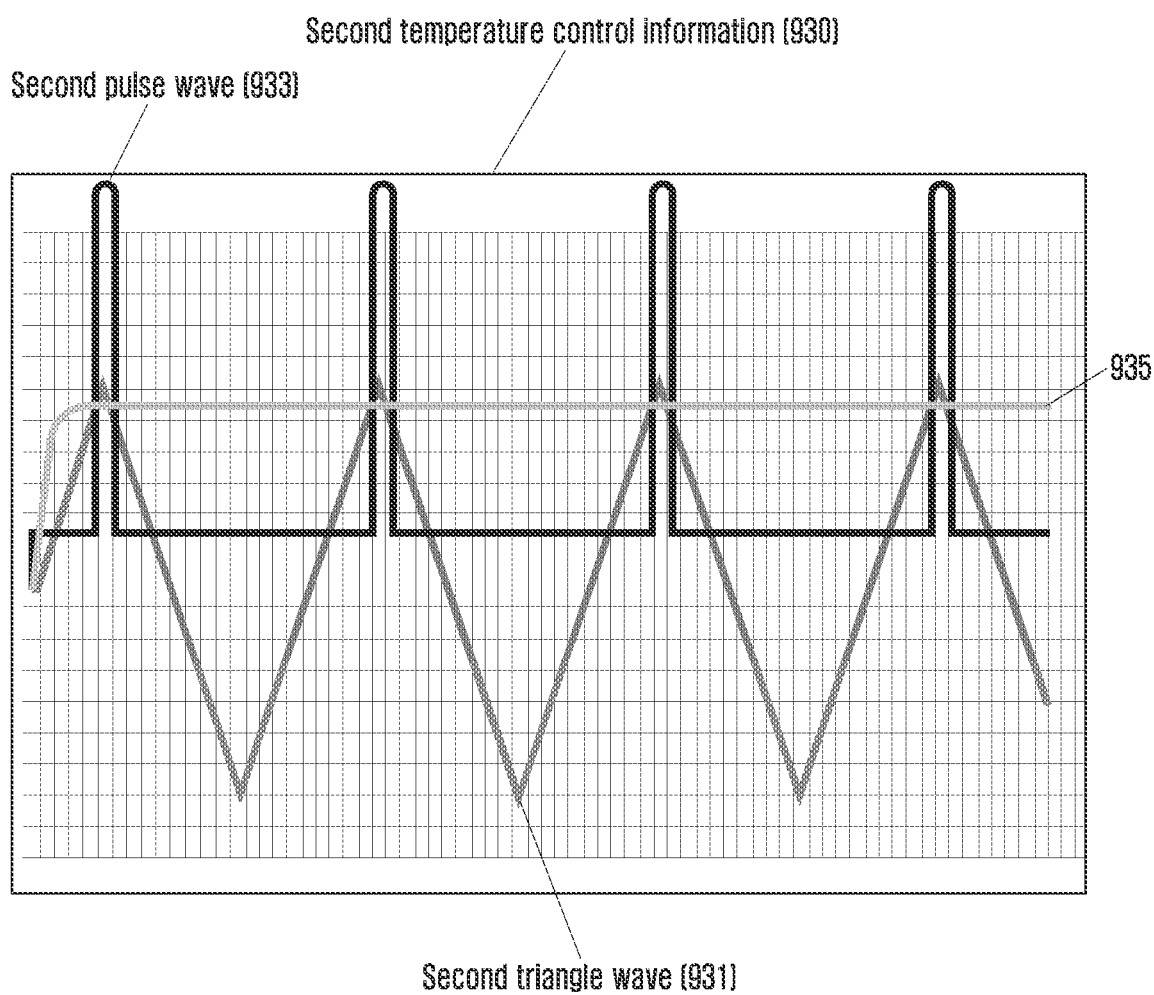
FIG. 9B is a graph illustrating another example of displaying temperature control information generated by a temperature control device using another hysteresis-based temperature setting according to an embodiment of the present disclosure.

FIG. 9A is a graph illustrating an example of displaying temperature control information generated by a temperature control device using one hysteresis-based temperature setting according to an embodiment of the present disclosure. FIG. 9B is a graph illustrating another example of displaying temperature control information generated by a temperature control device using another hysteresis-based temperature setting according to an embodiment of the present disclosure.

Referring to FIGS. 9A and 9B, a first triangle wave 911 and a second triangle wave 931 indicate triangle waves generated by a triangle wave generator. If the same types of triangle wave generators are used, the first triangle wave 911 and the second triangle wave 931 can be substantially the same.

A first pulse wave 913 and a second pulse wave 933 indicate temperature control information generated by the temperature control device 140, 240 according to the present disclosure. Namely, the temperature control device 40, 240 operates in a region where a rectangular pulse wave is generated.

A pulse wave of second temperature control information 930 of FIG. 9B is generated for a shorter time compared with first temperature control information 910 of FIG. 9A. Accordingly, if the second temperature control information is used, the communication base station system can operate by driving the temperature control device for a shorter time.

The difference between the first temperature control information 910 of FIG. 9A and the second temperature control information 930 of FIG. 9B is generated according to the difference of the hysteresis-based temperature settings. For example, a first base temperature of the hysteresis-based temperature setting is shown at 925 of FIG. 9A. When the first base temperature of the hysteresis-based temperature setting is changed as shown at 935 of FIG. 9B, the resulting second temperature control information 930 is varied from the first temperature control information 910. As noted above, a user can set the hysteresis-based temperature settings by using the values of analog elements included in the circuit.

Figure 10:
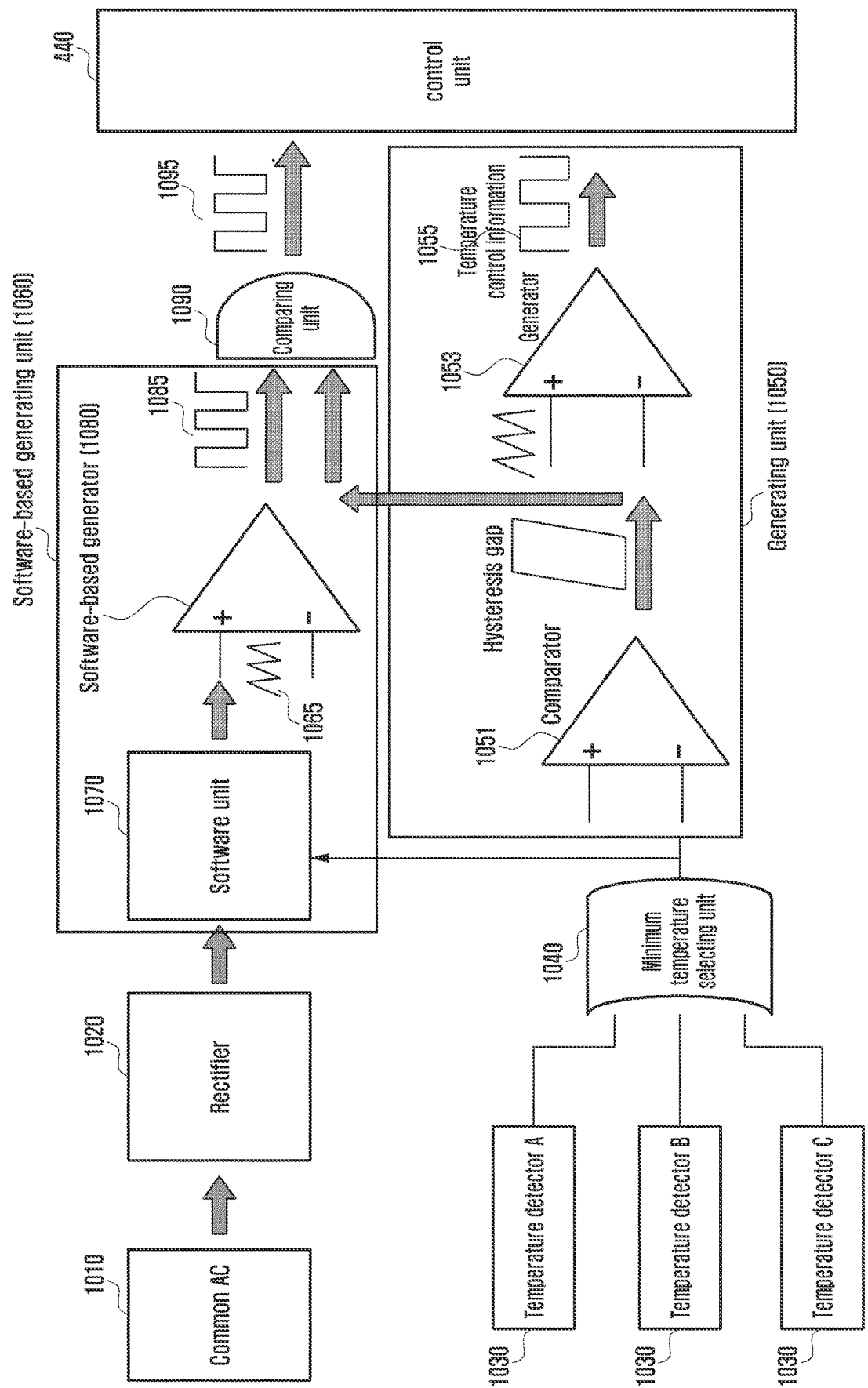
FIG. 10 is a block diagram illustrating a procedure of generating temperature control information by using a temperature control device based on software according to another embodiment of the present disclosure.

FIG. 10 is a block diagram illustrating a procedure of generating temperature control information by using a temperature control device based on software according to another embodiment of the present disclosure. FIG. 10 is a block diagram illustrating a software-based generating unit in parallel with the generating unit 430 of the temperature control device 140, 240 of FIGS. 4 and 5 in greater detail.

Referring to FIG. 10, in this embodiment, a temperature control device based on software is defined as a software-based temperature control device in order to distinguish it from the temperature control device 140, 240.

If an external common AC power 1010 is supplied to operate the communication base station system, a rectifier 1020 converts the supplied AC power 1010 to DC power, and supplies the converted DC power to the software-based generating unit 1060.

If the DC power is supplied, at least one temperature detector A, B, C, 1030 located in the communication base station system detects temperature at each location. If temperatures are detected by the temperature detectors A, B, C, 1030, the minimum temperature selecting unit 1040 selects the minimum temperature from the detected temperatures. The minimum temperature is selected because temperatures at all the locations should exceed a base temperature so that all the components in the communication base station can operate in a normal condition.

The selected minimum temperature is transmitted to the generating unit 1050 and the software-based generating unit 1060.

If the selected minimum temperature is transmitted to the software-based generating unit 1060, the software-based generating unit 1060 generates software-based temperature control information 1085 by using a software unit 1070 and a software-based generator 1080. For example, in order to generate the software-based temperature control information 1085, the software-based generating unit 1060 can set a base value by using a base temperature and a proportional integral derivative (PID) control of the software unit 1070. If the set base value is transmitted to the software-based generator 1080, the software-based generator 1080 can generate the software-based temperature control information 1085 by comparing the set base value and a triangle wave 1065 generated by a triangle wave generator (not shown).

If the selected minimum temperature is also transmitted to the generating unit 1050, the signal output by the comparator 1051 is input to the generator 1053 which generates temperature control information 1055. The procedure of generating the temperature control information 1055 is substantially the same as the procedure described in regard to FIG. 5.

A signal output by a comparator 1051 is transmitted to a comparing unit 1090 of the software-based temperature control device. Further, if the software-based temperature control information 1085 is generated, the software-based temperature control information 1085 is also transmitted to the comparing unit 1090.

If the signal output by the comparator 1051 of the temperature control device 1050 is substantially the same as the software-based temperature control information 1085, the temperature control device is operated using temperature control information 1095. If the temperature control information 1095 is generated, it is communicated to the control unit 440 and the control unit 440 can control the temperature control device 140, 240 by using the temperature control information.

If the signal output by the comparator 1051 of the temperature control device 1050 is not substantially the same as the software-based temperature control information 1085, the temperature control device does not operate.

The use of the software-based temperature control device avoids malfunctions of the temperature control device. In more detail, in the case where a temperature control device is out of order and an internal system temperature exceeds the base temperature, the temperature control device continues to operate because the temperature cannot be controlled; thereby a fatal error can be generated in the communication base station system. Accordingly, a malfunction can be avoided by operating the temperature control device only when the temperature control information is substantially the same between the software-based temperature control device and the property-based temperature control device.

According to the present disclosure, there can be stable control of a temperature control device in the case that a peripheral temperature changes rapidly in a communication base station system and also in the case that the peripheral temperature changes slowly in the vicinity of a specific temperature (for example, base temperature).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device for controlling a temperature of a base station, the device comprising:
   a transceiver;
   a plurality of temperature sensors;
   a comparator electrically connected to the plurality of temperature sensors;
   a software-based temperature control device; and
   a controller configured to:
     collect temperature information from the plurality of temperature sensors in the base station,
     set a hysteresis base temperature including a first base temperature for starting an operation of a temperature device and a second base temperature for stopping the operation of the temperature device,
select first temperature information from the temperature information, the first temperature information being associated with a minimum temperature,
generate first control information based on the hysteresis base temperature and the first temperature information using the comparator, the first control information indicating a first operation period of the temperature device,
generate second control information based on the first temperature information using the software-based temperature control device, the second control information indicating a second operation period of the temperature device,
compare the first control information and the second control information, and
control the operation of the temperature device based on the second operation period, in case that the second operation period is identical to the first operation period.

2. The device of claim 1,
wherein the hysteresis base temperature is determined based on property values of analog elements included in the device.

3. The device of claim 1,
wherein the first temperature information is a first input of an operational amplifier (OPAMP),
wherein an output of the OPAMP is fed back as a second input of the OPAMP, and
wherein the controller is further configured to:
generate a first output in case that the first temperature information is lower than the first base temperature, and
generate a second output in case that the first temperature information is higher than the second base temperature.

4. The device of claim 1, wherein the controller is further configured to control the temperature device to start an operation in case that the first temperature information is lower than the first base temperature.

5. The device of claim 1, wherein the controller is further configured to control the temperature device to stop an operation in case that the first temperature information is higher than the second base temperature.

6. The device of claim 1, wherein the controller is further configured to:
prevent an operation of the temperature device in case that the second control information is not identical to the first control information.

7. The device of claim 1, wherein each of the first control information and the second control information comprises a pulse width modulation (PWM) signal.

8. The device of claim 2, wherein the plurality of temperature sensors includes at least one negative temperature coefficient (NTC) thermistor.

9. The device of claim 1, wherein, when the second control information is generated, the controller is further configured to:
set a base value based on the hysteresis base temperature and a proportional integral derivative (PID) control, by using the software, and
generate the second control information based on the base value.

10. A method for controlling a temperature of a base station, the method comprising:
collecting temperature information from a plurality of temperature sensors in the base station;
setting a hysteresis base temperature including a first base temperature for starting an operation of a temperature device and a second base temperature for stopping the operation of the temperature device;
selecting first temperature information from the temperature information, the first temperature information being associated with a minimum temperature;
generating first control information based on the hysteresis base temperature and the first temperature information using a comparator electrically connected to the plurality of temperature sensors, the first control information indicating a first operation period of the temperature device;
generating second control information based on the first temperature information using a software-based temperature control device, the second control information indicating a second operation period of the temperature device;
comparing the first control information and the second control information; and
controlling the operation of the temperature device based on the second operation period, in case that the second operation period is identical to the first operation period.

11. The method of claim 10, wherein the hysteresis base temperature is determined based on property values of analog elements included in the temperature device.

12. The method of claim 10, wherein the setting of the hysteresis base temperature comprises:
receiving the first temperature information as a first input of an operational amplifier (OPAMP);
receiving an output of the OPAMP fed back as a second input of the OPAMP;
generating a first output in case that the first temperature information is lower than the first base temperature; and
generating a second output in case that the first temperature information is higher than the second base temperature.

13. The method of claim 10, wherein the controlling of the temperature device further comprises controlling the temperature device to start an operation in case that the first temperature information is lower than the first base temperature.

14. The method of claim 10, wherein the controlling of the operation further comprises controlling the temperature device to stop an operation in case that the first temperature information is higher than the second base temperature.

15. The method of claim 10, wherein the controlling the temperature device comprises:
preventing an operation of the temperature device in case that the second control information is not identical to the first control information.

16. The method of claim 10, wherein each of the first control information and the second control information comprises a pulse width modulation (PWM) signal.

17. The method of claim 11, wherein the plurality of temperature sensors includes at least one negative temperature coefficient (NTC) thermistor.

18. The method of claim 10,
wherein the generating of the second control information comprises:
setting a base value based on the hysteresis base temperature and a proportional integral derivative (PID) control, by using the software; and generating the second control information based on the base value.

\* \* \* \* \*